United States Patent [19]

Nuti

[11] Patent Number: 4,829,967

[45] Date of Patent: May 16, 1989

[54] TWO-STROKE INTERNAL COMBUSTION ENGINE, WITH FUEL INJECTION AND CONTROLLED IGNITION

[75] Inventor: Marco Nuti, Pisa, Italy

[73] Assignee: Piaggio & C. S.p.A., Genoa, Italy

[21] Appl. No.: 110,912

[22] Filed: Oct. 21, 1987

[30] Foreign Application Priority Data

Oct. 22, 1986 [IT] Italy ................. 22086 A/86

[51] Int. Cl.⁴ ............................................. F02M 39/00
[52] U.S. Cl. ........................... 123/506; 123/73 AD; 123/458
[58] Field of Search ................. 123/506, 73 AD, 458, 123/500-501

[56] References Cited

U.S. PATENT DOCUMENTS

| 4,574,756 | 3/1986 | Ito ............................ | 123/506 |
| 4,586,656 | 5/1986 | Wich ........................ | 123/506 |
| 4,619,239 | 10/1986 | Wallenfang ............. | 123/506 |
| 4,709,679 | 12/1987 | Djordjeuil ................ | 123/506 |
| 4,711,216 | 12/1987 | Takeuchi ................. | 123/506 |
| 4,714,068 | 12/1987 | Nagase .................... | 123/506 |

FOREIGN PATENT DOCUMENTS 0128428 8/1983 Japan ................. 123/506

Primary Examiner—Carl Stuart Miller
Attorney, Agent, or Firm—Diller, Ramik & Wight

[57] ABSTRACT

In a two-stroke internal combustion engine, with fuel injection and controlled ignition, a valve is provided, which allows or prevents the inflow of fuel into the combustion chamber; such a valve is driven by an electromagnet controlled by a control unit as a function of the engine operating parameter.

8 Claims, 2 Drawing Sheets

TWO-STROKE INTERNAL COMBUSTION ENGINE, WITH FUEL INJECTION AND CONTROLLED IGNITION

The present invention relates to a two-stroke internal combustion engine, with fuel injection and controlled ignition.

It is known that the advantages deriving from the use of the direct injection of fuel into the combustion chamber of the controlled-ignition engines can be generally summarized as a lower engine trend to knocking, and as the consequent possibility of exploiting higher compression ratios.

In particular for the two-stroke engines, further advantages are attained, such as the reduction in consumptions and in emissions of unburnt hydrocarbons, thanks to the proper timing of the same injection, useful to prevent the loss of fresh mixture to the exhaust during the scavenge stroke.

It is known as well that with the necessarily mechanical pumps to be used, to the purpose of securing the high injection pressures required, difficulties are met in the flowrate adjustment, due both to the discordance between the characteristic variation law of the pumps, and the requirement of feed per engine revolution with changing revolution rate.

Beside the problem of the adjustment of the flowrate, with the use of the traditional injection pumps the practical impossibility has moreover to be faced, of vraying the timing of the same injection; if, indeed, it were, even theoretically only, possiblee to install, together with the same pumps, purposely designed devices, these latter would show such a complexity as to exclude their use for a series production, both due to economical reasons, and, above all, to reliability reasons. In any case, a complete possibility of varying the timing would not be obtained: one could act either on the beginning, or on the end of the injection stroke, but acting on both of the them, by the same device, would be impossible.

This practical impossibility of varying the timing is a particularly felt limitation for the two-stroke engines, for which, as it has already been told, avoiding introducing fresh mixture while the scavenge stroke is in progress is suitable.

Furthermore, for the two-stroke engines, the problem occurs of the poor filling under partial loads: from this, failed ignitions derive, and consequently irregularities in engine operation, which, in association with the fact that the fuel is in any case injected, cause high consumptions and pollution rates; should it be possible to interrupt the injection, e.g., on alternate cycles, a more efficient scavenge, and hence a safer combustion would be obtained, thanks to the higher oxygen percentage which would therefrom derive at the end of the compression stroke.

Purpose of the present invention is to find a solution to the above said problems.

Such a purpose is achieved by a two-stroke internal combustion engine, with fuel injection and controlled ignition, provided with at least one cylinder, and related piston, wherein a pump draws fuel from a tank and delivers it to the combustion chamber along a delivery duct, characterized in that said delivery duct is in communication with said tank under the control of a valve provided with a shutter movable between a first position, in which said delivery duct is in communication with said tank, and a second position in which said communication is interrupted, said shutter being driven by an electromagnetic actuator connected to a control unit which commands the energizing or the de-energizing of said electromagnetic actuator, as a function of engine operation parameters.

Hereunder an exemplifying non-limitative embodiment is disclosed of the present invention, illustrated in the hereto attached drawings, wherein.

Figure 1:
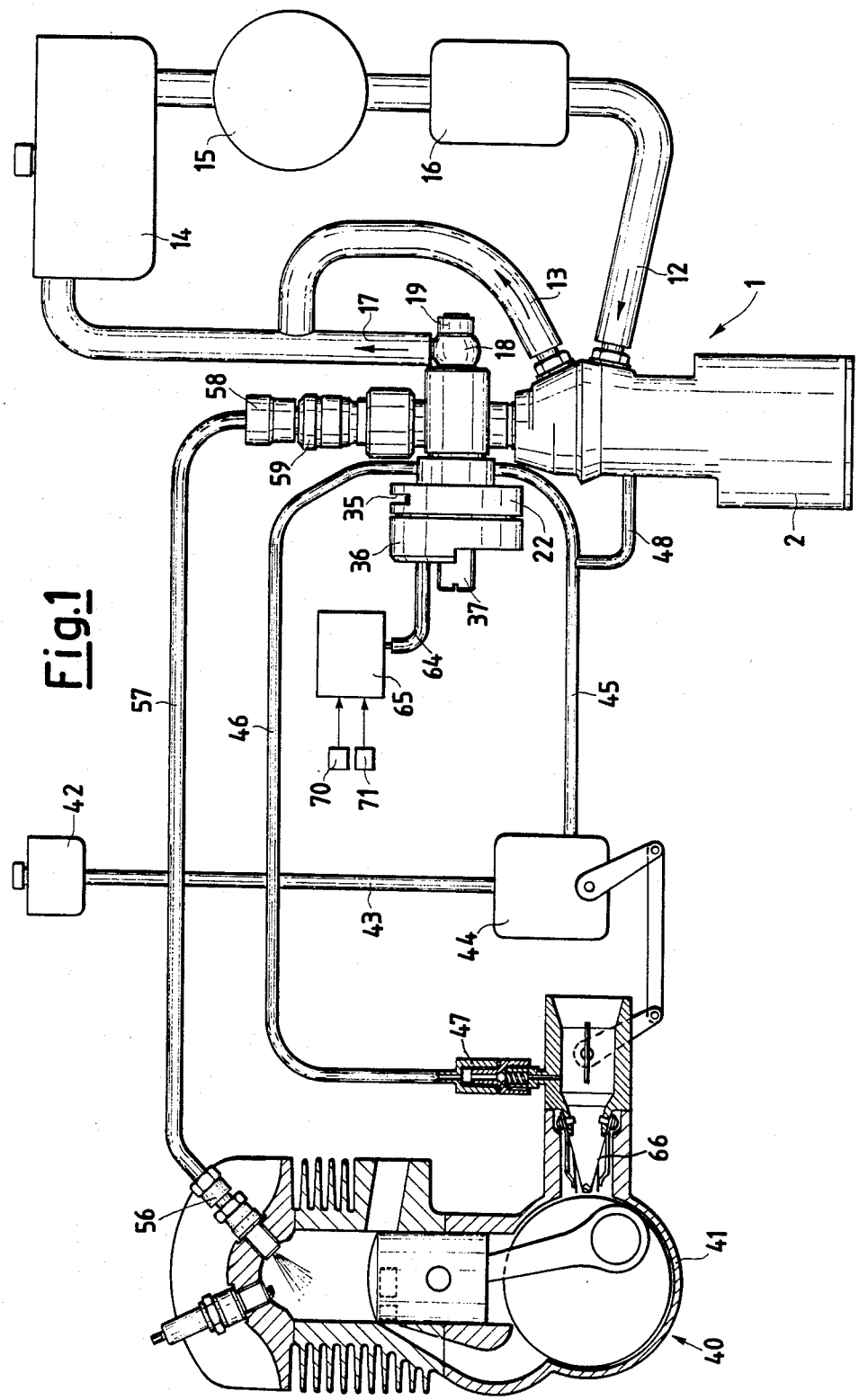
FIG. 1 shows a general view of a two-stroke engine according to the invention.

The pump herein illustrated, of reciprocating type, generally indicated with 1, is constituted by a pump body 2, wherein a cylinder 3, a connector 4, a further link with cross-head 5, a connecting rod 6, an eccentric shaft 7, a piston 8 connected by means of said link 5 to the connecting rod 6 and operating inside a hollow 9 provided inside the body of the cylinder 3 and of the connector 4. To the pump body 2, the two ducts: the feed duct 12 and the discharge duct 13, for the fuel coming from the tank 14, through the feed pump 15, are furthermore connected, by means of two connectors 10 and 11; on said feed duct 12, a filter 16 is provided; the discharge duct 13 leads to a further discharge duct 17 connected, through an orientable connector 18 and screw 19, to the electromagnetically driven fuel tapping or control valve, generally indicated with 20.

The above said valve 20 is composed of a valve stem 26 carrying a valve head 26a generally housed in a valve body 21, screwed down on the connector 4, and on which the supporting element 22 is screwed down in its turn. Between said element 22 and the valve body 21, a washer 23 is interposed, which practically constitutes the stroke limit element, or stop shoulder, for the movable valve stem 26 and valve head 26a of the valve 20; onto such an element in fact the spacer 24, which is made integral with the plate 25 and the valve stem 26 through the ring 27 and the nut 28 screwed down on the stem 26. Both the plate 25 and the stem 26, as well as the spacer 24, together with the ring 27 and the nut 28 constitute in practice the whole of the movable components of the valve 20; they are pushed by the action of the spring 29 into a first position in which the valve 20 is open. In the open position the hollow 9 is connected with the discharge duct 17; in fact, between the threaded head of stem 26 and the inner wall of the valve body 21, an air gap is generated, through which the fuel, present inside the pressurized hollow 9, flows and, by flowing through channels provided inside the screw 19, and from there into the orientatable connection 18, is conveyed, by means of duct 17, up to the fuel tank 14.

Figure 2:
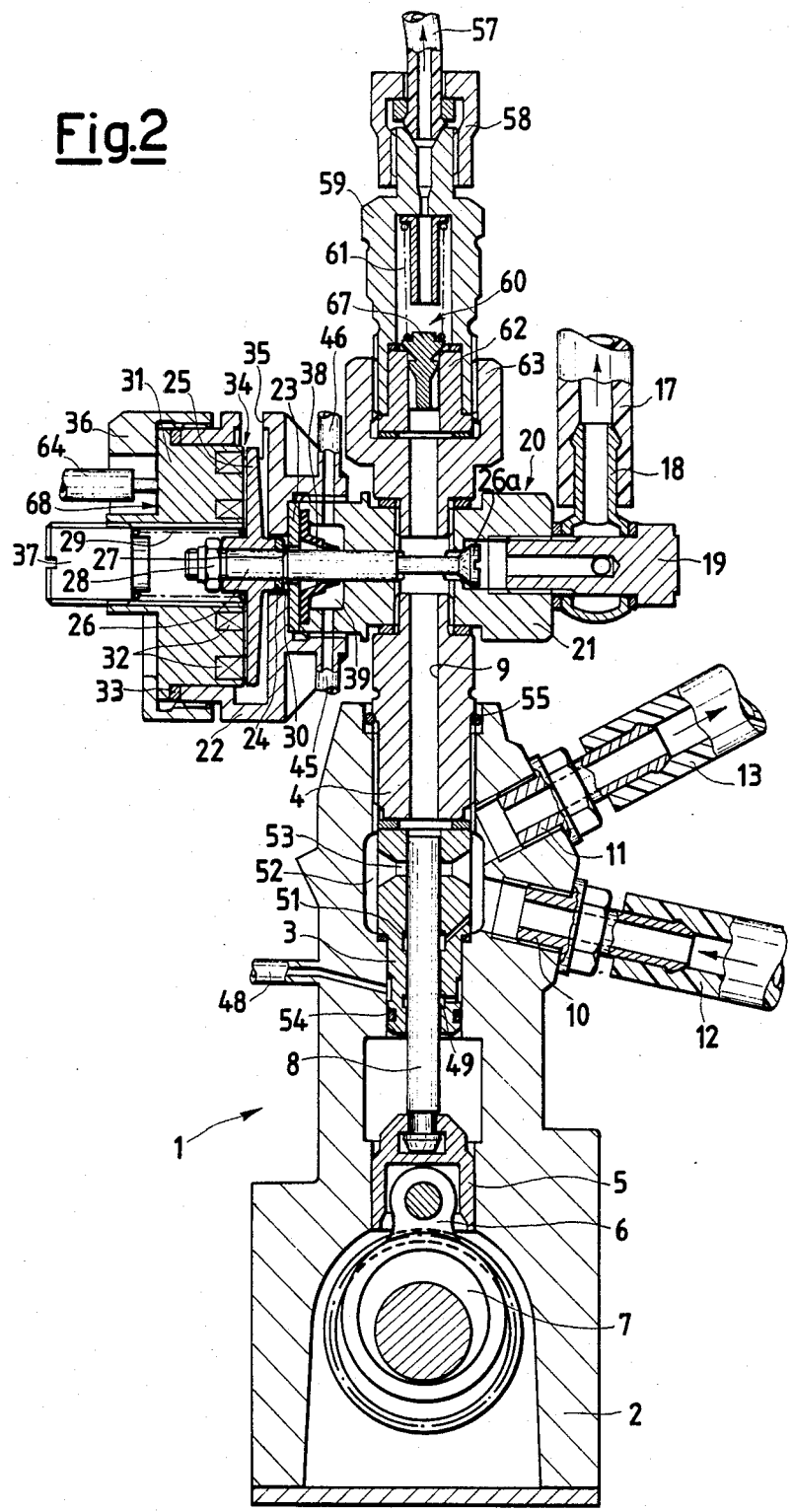
FIG. 2 shows a sectional view of the injection pump of the engine of FIG. 1

The spacer 24 is, among others, the adjustment element, by which the stroke of the movable portion of valve 20 is adjusted; in fact, as shown in FIG. 2, the stroke length, indicated with 30, is a function of the size or thickness of the spacer 24.

The support element 22 houses inside its interior the above components of the movable portion of the valve, partly including stem 26, as well as the spring 29, the stator 31 of electromagnet 68, the related coils 32 and the ring 33 provided between said stator and the same support element 22, so to constitute an adjustment means for the air gap 34; the size of this latter, among others, can be verified, because access to it can be had through the opening 35 provided in a suitable area of support 22.

The fastening of the stator 31 of electromagnet 68 is secured by the closure element 36, which is connected to support 22, by means of a screw-connection. In correspondence of the axis of the valve, the screw plug 37 is provided, which allows the pre-loading of spring 29 to be adjusted, to the purpose of optimizing the times of opening and closure transients of the fuel tapping valve 20. The coils 32 are fed through the power supply cable 64, connected to the electronic control unit 65.

With 38 indictaed is a ring of elastic material, serving to secure the tight sealing against the possible losses, due to fuel leakage through the stem 26 and the valve body 21; losses which are prevented also thanks to the presence in the hollow 39 of the pressurized oil serving for the normal lubrication of the block 40 containing the cylinder and related piston; as shown, the lubricating oil, before being sent to the sump 41 of block 40, is circulated through the tapping valve 20, so to provide also the lubrication of the stem 26 thereof; the complete lubrication system is constitued, as shown at FIG. 1, by the oil reservoir 42, by the duct 43 connecting said reservoir with the variable-flowrate lubrication pump 44, by the duct 45 for connection of said pump with the valve 20, and finally by the duct 46, connecting the tapping valve 20 with the back-pressure valve 47 situated on engine intake side; intake side which is accomplished, in the exemplifying embodiment as shown, by means of the blade valve 66. The contrivance of exploiting the engine lubricating oil also to lubricate the valve stem allows to unavoidable, very small amounts of fuel leakages to be sent, together with the oil, to the engine sump, and thus disposed of; which, should the lubrication of the valve take place by separate closedloop circulation, would obviously be not possible.

By means of the further duct 48, branching off from the main lubrication system, the oil is conveyed up to the annular hollow 49 provided around the piston 8, so to create a medium-pressure area, useful to prevent any leakages of the low-pressure fuel coming from the feed duct 12 along the side surface of the same piston.

In FIG. 2, the annular hollow 51, communicating with the low-pressure chamber 52, is shown as well; said hollow 51 serves to collect the fuel leaking along the piston 8, in the stretch comprised between the inlet ports 53 and the same hollow 51, and to bring said fuel back into the chamber 52.

Furthermore, the rings 54 and 55 secure the tight sealing against the leakages occurring along the outer surfaces of respectively the cylinder 3 and the connection 4.

The pressurized fuel present inside the hollow 9 is sent to the injector 56 by means of a duct 57 connected by a pressure coupling to the connector 58, which is fastened, in its turn, by screwing down, to the delivery connection 59, inside which also the delivery valve 60 of the injection pump, complete with the shutter 67, with the related spring 61 and with the valve body 62, is situated; the connection 63 constitutes, furthermore, the connection element between the delivery connection 59 and the tapping valve 20 body, and practically represents the end portion of the pump cylinder, inside which the highpressure chamber of the same pump is provided.

The operation of the above disclosed system is illustrated hereunder.

In the position of FIG. 2, the piston 8 is in its position of upper dead center; the fuel has been just injected into the engine combustion chamber.

When, during its stroke downwards, the upper edge of the piston 8 uncovers the inlet ports 53, the fuel present inside the chamber 52 starts flowing into the hollow 9, and this until the connecting rod 6 reaches its lower dead point; from this moment, the upwards stroke of the piston 8 starts, during which the fuel is made flow again into the chamber 52, until the upper edge of the same piston completely covers the inlet ports 53; only now the geometrical delivery starts of the fuel, on condition that the tapping valve 20 is not in its opening position or, which is the same, provided the electromagnet 68 is not de-energized; in such a case, in fact, the fuel would outflow through the interior of the hollow screw 19 and the orientable connection 18 towards tank 14.

Thus, with the valve 20 being closed, as shown in FIG. 2, the fuel pressurized inside the hollow 9, thanks to the work generated by the piston 8, causes the lifting, and thus the opening of the shutter 67, counteracted by the spring 61; the shift of the above said shutter 67 generates, in its turn, the geometrical delivery of the fuel present downstream the same valve 60. By considering that the flowrate of the pump is directly proportional to the delivery time, by a suitable driving of the electromagnet 68 the possibility is achieved of varying both the amount of fuel injected and the timing of the injection, with the lower limit and the upper limit of this latter remaining bound, as it has been seen, to the position of the inlet ports 53 relatively to the position of the dead points of the stroke of piston 8.

If the electromagnet 68 would be even left deenergized throughout the time period related to an engine revolution, no amount of fuel would be injected during that cycle; this is precisely the way by which obtained is the operation by discontinuous cycles, the suitability of which has been evidenced in the first section of the instant specification, to the purpose of attaining the objective of a more efficacious scavenging at the partial loadings.

The proposed system shows, in conclusion, to be advantageous as compared to a traditional system, both because it offers the above said opportunity, and because it presents, in general, an extreme flexibility of use, thanks to the adoption of the control unit of electronic type; as, in fact, it is known, through such control types, a large number of input parameters can be easily managed, and thus a sophisticated control can be obtained of the injection by using a very simple actuator, such as, e.g., the present electromagnetic actuator, as herein disclosed. In particular, in the exemplified embodiment as illustrated, as inputs to the control unit 65 two electrical signals are delivered, which are respectively proportional to the revolution rate of the engine, and to the positions of the throttle valve provided on the intake duct of the same engine: with 70 and 71, two blocks have been indicated, which respectively show, in a schematic way, a transducer of the revolution rate of the engine, and a transducer of the position of the throttle valve.

The control algorithm adopted shall hence be a consequence of such input variables.

The transducer of the revolution speed of the engine can be constituted by a device which sends an electrical impulse to the control unit 65 at each revolution of the driving shaft; in this way, the control unit 65 can drive the above said operation by discontinuous cycles, by having the information of the engine revolution speed.

Clearly, other input variables to the control unit 65 can be provided, in addition to, or as an alternative to those as disclosed, e.g., variables relating to the temperature of the engine and of the intaken air.

The tapping valve 20 undergoes structural changes both as a whole, and in its parts, without thereby going out of the scope of the present invention.

In lieu of the tapping valve, an on-off valve can be provided, always electromagnetically driven, as seen above, installed on the delivery duct, which, to the contrary of the tapping valve, causes, when it is in its closed position (closed shutter), the outflow of the fuel from the delivery towards the tank, and, when it is in its open position (opened shutter), allows the inflow of the fuel to the combustion chamber: along the duct which connects the delivery duct with the fuel tank, a valve must be then provided, which in this latter position (open position) prevents the fuel to flow towards the tank.

The two-stroke engine of the Example as illustrated is a single-cylinder engine; the disclosed system can be applied anyway, with obvious changes, to a multi-cylinder two-stroke engine.

I claim:

1. An internal combustion engine with fuel injection and controlled ignition including at least one cylinder and a related piston; a pump which draws fuel from a tank and delivers the fuel to a combustion chamber through a delivery duct characterized in that said delivery duct is in communication with said tank under the control of a control valve provided with a valve head, said control valve being movable between a first position in which said delivery duct is in communication with said tank and a second position in which said communication is interrupted; said valve head being driven by an electromagnetic actuator connected to a control unit which commands the energizing or de-energizing of said electromagnetic actuator as a function of engine operation parameters; a system for the lubrication of said cylinder and piston, said valve head being carried by a valve stem sliding inside a seat, and said lubrication system being in fluid communication with said valve stem for the lubrication of said control valve.

2. The engine according to claim 1 wherein said pump comprises a piston sliding inside and defining a gap relative to a housing, and said lubrication system being in fluid communication with said housing so as to create a pressure area inside said gap which prevents the fuel from leaking along said gap.

3. An internal combustion engine with fuel injection and controlled ignition including at least one cylinder and a related piston; a pump which draws fuel from a tank and delivers the fuel to a combustion chamber through a delivery duct characterized in that said delivery duct is in communication with said tank under the control of a control valve provided with a valve head, said control valve being movable between a first position in which said delivery duct is in communication with said tank and a second position in which said communication is interrupted; said valve head being driven by an electromagnetic actuator connected to a control unit which commands the energizing or de-energizing of said electromagnetic actuator as a function of engine operation parameters; said valve head being located in a discharged duct which places said delivery duct in fluid communication with said tank, said control unit be connectd to a transducer connected to a driving shaft of said engine, and said transducer signals said control unit during the revolution of the driving shaft, for every revolution of the driving shaft, the occurred revolution of said driving shaft.

4. An internal combustion engine with fuel injection and controlled ignition including at least one cylinder and a related piston; a pump which draws fuel from a tank and delivers the fuel to a combustion chamber through a delivery duct characterized in that said delivery duct is in communication with said tank under the control of a control valve provided with a valve head, said control valve being movable between a first position in which said delivery duct is in communication with said tank and a second position in which said communication is interrupted; said valve head being driven by an electromagnetic actuator connected to a control unit which commands the energizing or de-energizing of said electromagnetic actuator as a function of engine operation parameters; said valve head being located in a discharged duct which places said delivery duct in fluid communication with said tank; a system for the lubrication of the cylinder and piston, said valve head being carried by a valve stem sliding inside a seat, and said lubrication system being in fluid communication with said valve stem for the lubrication of said control valve.

5. An internal combustion engine with fuel injection and controlled ignition including at least one cylinder and a related piston; a pump which draws fuel from a tank and delivers the fuel to a combustion chamber through a delivery duct characterized in that said delivery duct is in communication with said tank under the control of a control valve provided with a valve head, said control valve being movable between a first position in which said delivery duct is in communication with said tank and a second position in which said communication is interrupted; said valve head being driven by an electromagnetic actuator connected to a control unit which commands the energizing or de-energizing of said electromagnetic actuator as a function of engine operation parameters; said control unit being connected to a transducer connected to a drive shaft of said engine, and said transducer signals said control unit during the revolution of the driving shaft, for every revolution of the driving shaft, the occurred revolution of said driving shaft; a system for the lubrication of the cylinder and piston, said valve head being carried by a valve stem sliding inside a seat, and said lubrication system being in fluid communication with said valve stem for the lubrication of said control valve.

6. The engine according to claim 5 wherein said control unit drives said electromagnetic actuator to keep the valve in said first position at least once per revolution of the driving shaft during the delivery stroke.

7. The engine according to claim 5 wherein said control unit drives said electromagnetic actuator to keep the control valve throughout the delivery stroke in said first position on alternate revolutions of said driving shaft.

8. An internal combustion engine with fuel injection and controlled ignition including at least one cylinder and a related piston; a pump which draws fuel from a tank and delivers the fuel to a combustion chamber through a delivery duct characterized in that said delivery duct is in communication with said tank under the control of a control valve provided with a valve head, said control valve being movable between a first position in which said delivery duct is in communication with said tank and a second position in which said communication is interrupted; said valve head being driven by an electromagnetic actuator connected to a control unit which commands the energizing or de-energizing of said electromagnetic actuator as a function of engine operation parameters; said pump comprises a piston sliding inside and defining a gap relative to a housing, and a lubrication system in fluid communication with said housing so as to create a pressure area inside said gap which prevents the fuel from leaking along said gap.

* * * * *